March 15, 1932.  C. W. WAAS  1,849,341
PLAY VEHICLE
Filed Aug. 14, 1929
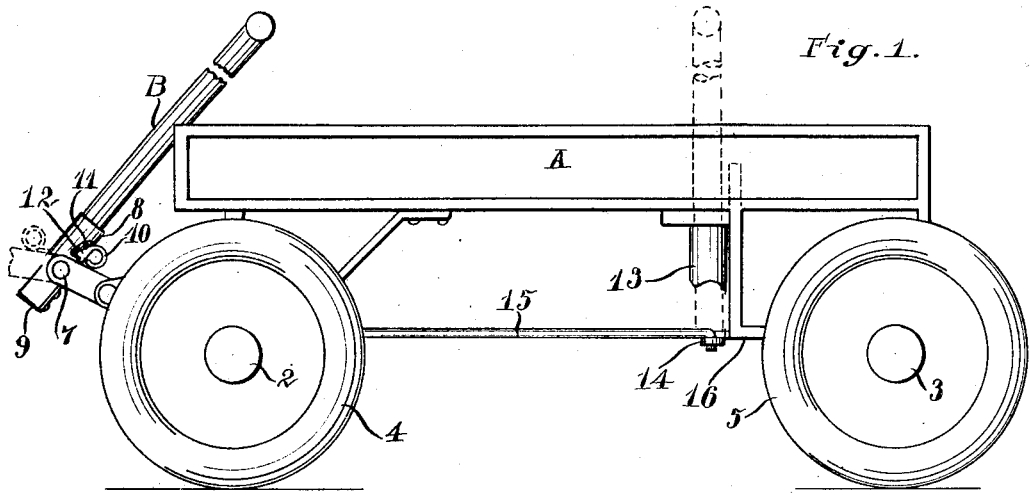
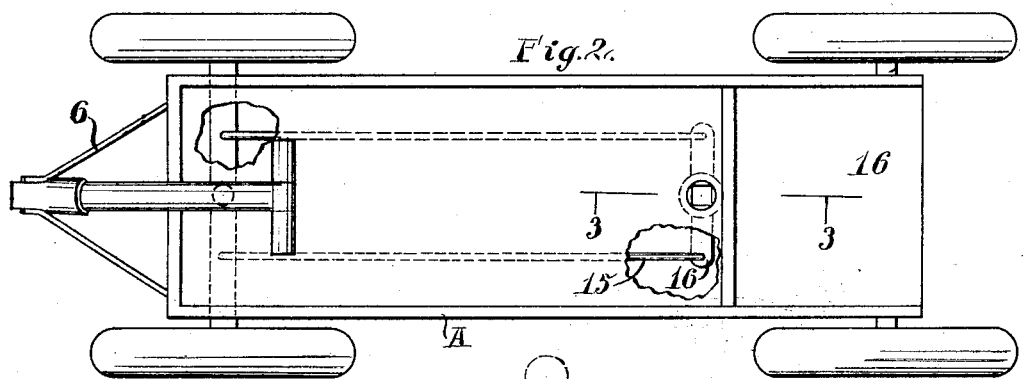
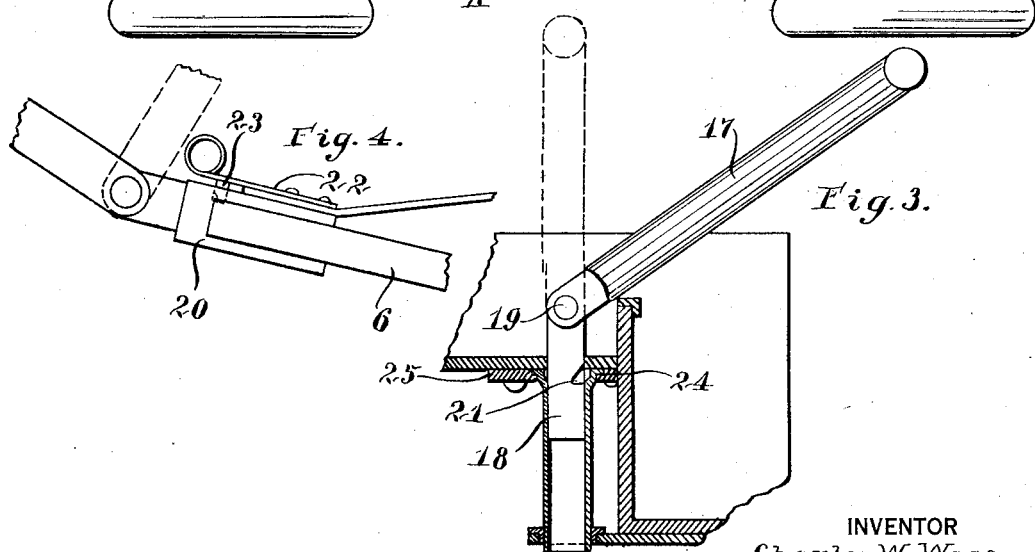
INVENTOR
Charles W. Waas
BY
ATTORNEY Patented Mar. 15, 1932

1,849,341

UNITED STATES PATENT OFFICE

CHARLES W. WAAS, OF ST. PAUL, MINNESOTA

PLAY VEHICLE

Application filed August 14, 1929. Serial No. 385,790.

My invention relates to improvements in children's play vehicles.

An object of my invention is to provide improvements in connection with the handle and associated mechanism of the vehicle, whereby the handle is capable of removal, and double use, to transform the vehicle from one character of use to another character of use, as in transforming it from a coaster wagon to a scooter.

This and other features of my invention will be more specifically set forth in the following description and accompanying drawings, wherein:

Figure 1 is a view in side elevation of my invention.

Figure 2 is a plan view, shown partly broken away.

Figure 3 is a sectional view taken on line 3—3 of Figure 2, showing a modified construction of handle; and Figure 4 is a view in detail of the front locking means for the handle shown in Figure 3.

Referring to the drawings in detail, A represents a vehicle body supported in a suitable manner upon front and rear axles 2 and 3, which axles support front and rear wheels 4 and 5. The rear axle 3 is shown supported at the extreme rear of the vehicle body to prevent the body tipping backward when used as a scooter. To adapt my invention for use as a coaster, I provide the following mechanism:

Forwardly extending from the front axle are the brace arms 6, said brace arms pivotally supporting, intermediate their front ends, by means of a pivot 7, a socket member 8. The socket member 8 is cylindrical in shape at its upper end and at its lower end square, as particularly illustrated in Figure 1. B represents a cylindrical handle having a squared lower end and in use the handle is inserted into the socket member 8, with the squared lower end of the handle fitting into the squared lower end of the socket member to prevent turning of the handle.

To lock the handle in the socket member 8, I provide the following mechanism:

Supported upon one side of the socket member 8 is a spring 9, said spring being formed with an outwardly projecting finger gripping portion 10, at its upper free end. The spring 9 at its upper free end is formed upon its inner side with a lug 11 adapted to fit into a notch 12 in the lower end of the handle, the socket member 8 being formed with a corresponding notch to permit the lug passing through the socket member and into the notch in the handle. Consequently, when the handle is inserted in the socket member 8, the free upper end of the spring 9 will spring into locking engagement with the handle.

To permit the vehicle being used as a scooter, I support, underneath the body of the vehicle a short distance inside of its rear end, a socket member 13, said socket member being cylindrical at its upper end and squared at its lower end to receive the squared lower end of the cylindrical handle, as shown in Figures 1 and 2. The socket member 13 has rotatable support underneath the vehicle and carries outwardly extending arms 14 connected at their outer ends by links or rods 15, with the front axle as shown in Figure 2. Supported underneath the vehicle body at the rear of the socket member 13 is a platform 16. When the child uses the vehicle as a scooter he stands upon the rear platform 16, placing one foot upon the rear platform 16 to push the vehicle, and, by turning the handle B, turns the front axle to guide the vehicle in ordinary scooter fashion, or, the child may stand entirely upon the rear platform in coasting and in the same way steer the vehicle.

In using the handle inserted in the front, the child may use the handle to pull the vehicle or sit in the body and steer it, in coasting, by the handle.

In Figures 3 and 4 I show a modified construction of handle. In this construction the handle is made of two members, a cylindrical handle portion 17 and an end squared portion 18 connected by a pivot 19. In utilizing the handle shown in Figure 3, I utilize the modified construction of a front handle supporting socket 20. The socket 20 is fixedly supported between the ends of the arm braces 6 in substantially horizontal position, the socket 20 being entirely a squared socket. The squared end 18 of the handle is inserted within this squared socket, as shown in Figure 4, and is formed on its upper side with a notch 21. Supported on top of the socket 20 is a spring 22 corresponding with the spring 9. The spring 22 at its free end is formed with a downwardly projecting lug 23 which passes through an opening in the socket 20 and into the notch 21 of the squared end of the handle, in the same manner as the corresponding parts act in the construction shown in Figure 1.

In the use of the modified form shown in Figures 3 and 4, where the vehicle is used as a coaster with the handle supported in the front end, the handle simply turns upon the pivot 19 into position for use, instead of the handle holding socket itself turning on a pivot.

Where my invention with the pivoted handle shown in Figure 3 is used as a scooter, the handle will be held in a straight position, as shown in dotted lines in Figure 3, where the handle is forced far enough down in the socket to bring the hinged joint within the socket. The handle may be raised in the socket and turned to the solid line position shown in Figure 3, with the handle portion resting upon the upwardly extending end of the front wall of the platform. The rotatability of the rear socket is secured as shown in Figure 3 by the upper end of the socket being formed with the flange 24, the flange fitting into a corresponding groove in the supporting plate 25 secured underneath the vehicle body.

One advantage of the arrangement of links 15 extending from the ends of the arms 14 to the front axle parallel with the sides of the vehicle body is that the front wheels, when turned to a certain angle, will strike the link rods 15 and prevent the wheels being turned to an angle that would cause the vehicle to tip over.

By the use of my features of invention, as shown, I provide a combined coaster and scooter of great adaptability and one that permits the child getting the extreme of pleasure and use in coasting, scooting, and being drawn and steered. By means of the construction and arrangement of the rear support for the removable handle in connection with the rear supporting wheels, full protection is afforded against the vehicle tipping over backward in using the rear platform 16.

I claim:

A coaster wagon comprising a body, an axle fixedly connected to the rear of said body, and a second axle pivotally connected to the forward end of said body, wheels mounted on said axles, a forwardly extending fork connected to the front axle and having a pivotally mounted socket thereon, a handle removably mounted in said socket, a vertical socket spaced forwardly of the rear wheels and rearwardly of the forward wheels, a transverse arm carried by said rear socket, link means connecting the said arms to the forward axle, each of said sockets having an interior aperture to receive an end of said handle and grip said handle against relative rotation thereto.

In testimony whereof I affix my signature.

CHARLES W. WAAS.